United States Patent
Fryan

[19]

[11] Patent Number: 5,814,388
[45] Date of Patent: Sep. 29, 1998

[54] SCRUBBING DEVICE COMPRISES A WOVEN SCRIM AND ABSORBENT BODY

[75] Inventor: Michael C. Fryan, Livermore, Calif.

[73] Assignee: The Clorox Company, Oakland, Calif.

[21] Appl. No.: 532,532

[22] Filed: Sep. 22, 1995

[51] Int. Cl.[6] ............................... A47K 7/02; B32B 3/02
[52] U.S. Cl. ............................... 428/95; 428/86; 428/92; 15/209.1; 15/229.11
[58] Field of Search ................................ 428/95, 86, 92; 15/209.1, 229.11

[56] References Cited

U.S. PATENT DOCUMENTS

| | | | |
|---|---|---|---|
| 2,804,728 | 9/1957 | Politzer | 51/185 |
| 2,958,593 | 11/1960 | Hoover et al. | 51/295 |
| 3,080,688 | 3/1963 | Politzer | 51/185 |
| 3,109,703 | 11/1963 | Politzer et al. | 18/59 |
| 3,142,714 | 7/1964 | Politzer et al. | 264/27 |
| 3,280,517 | 10/1966 | Copeland | 51/400 |
| 3,385,751 | 5/1968 | Willard et al. | 428/95 |
| 3,600,261 | 8/1971 | Kerres | 428/95 |
| 3,634,901 | 1/1972 | Landsberg | 15/118 |
| 3,674,617 | 7/1972 | Mattes | 428/95 |
| 3,857,133 | 12/1974 | Linenfelser | 15/118 |
| 4,078,340 | 3/1978 | Klecker et al. | 51/295 |
| 4,130,683 | 12/1978 | Michel et al. | 428/194 |
| 4,190,550 | 2/1980 | Campbell et al. | 252/93 |
| 4,244,074 | 1/1981 | Barcikowski et al. | 15/114 |
| 4,264,337 | 4/1981 | Fenster et al. | 51/295 |
| 4,645,699 | 2/1987 | Neveu | 428/95 |
| 4,822,658 | 4/1989 | Pacione | 428/95 |
| 4,856,134 | 8/1989 | Wertz et al. | 15/104 |
| 4,949,417 | 8/1990 | Wertz et al. | 15/104 |
| 5,271,982 | 12/1993 | Verpoest et al. | 428/86 |

FOREIGN PATENT DOCUMENTS

| | | |
|---|---|---|
| 1434159 | 6/1966 | France . |
| 1107254 | 3/1968 | United Kingdom . |

OTHER PUBLICATIONS

Saunders, K.J., 1973, *Organic Polymer Chemistry*, Halsted Press, Chap. 14, pp. 318–345.

*Primary Examiner*—Terrel Morris
*Attorney, Agent, or Firm*—Fish & Richardson P.C.

[57] ABSTRACT

A scrubbing device is formed comprising an absorbent body, preferably regenerated cellulose sponge, having affixed on one surface thereof a woven web comprising a woven backing and pile fibers interwoven into the backing. The pile fibers form the scouring surface which has improved non-scratching characteristics and good cleaning properties. The improved nonscratching characteristics are due to the lack of mineral abrasive or hardened resins which bind fibers of non-woven scrims.

12 Claims, 3 Drawing Sheets

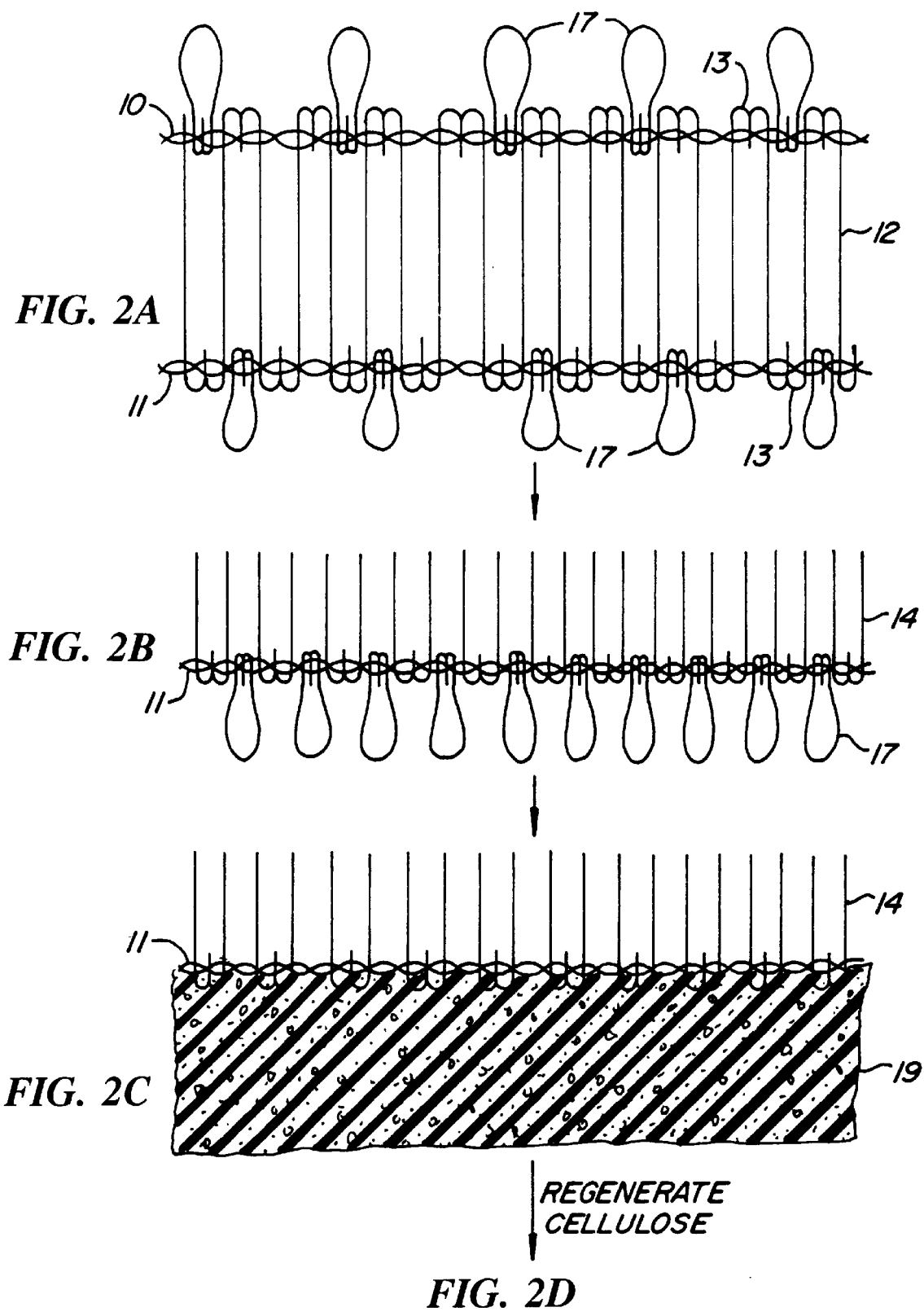

SCRUBBING DEVICE COMPRISES A WOVEN SCRIM AND ABSORBENT BODY

FIELD OF THE INVENTION

The present invention relates to the field of cleaning, and more particularly, to an improved scrubber which eliminates or significantly reduces scratching of common household materials, such as aluminum, Teflon, acrylic plastic, porcelain and other common surfaces found in kitchens and on kitchenware.

BACKGROUND OF THE INVENTION

Cleaning and scrubbing devices typically comprise relatively soft, water absorbent porous materials, such as natural or synthetic sponge, to which is laminated or attached on one surface thereof, a scrim which can contain an abrasive material. The present invention is directed to a scrubbing device which has a higher capacity for removing debris from a surface than a sponge, but which does not impart scratches to surfaces which occur when using other scouring devices comprising abrasive materials. Many of the abrasive surfaces on commercial devices comprise a scrim of non-woven synthetic fibers to which are attached finely divided hard abrasives such as silicon carbide, alumina, silica. Other softer abrasives include calcium carbonate, talc, and synthetic resins. A common way of applying the abrasives to the non-woven surfaces is by spraying the abrasives in a formulation of resin, whereby the abrasive character of the non-woven fibers can be controlled by the amount, nature and depth of penetration of the abrasives into the fiber pad. A problem with such scrims is, however, that the mineral abrasives scratch the surfaces which are being cleaned, since minerals can be harder than surfaces such as aluminum, Teflon and plastic.

Woven scrims, on the other hand, are not very lofty and do not have fibers projecting in random directions which can serve adequately as a foothold for a scrubbing surface. Moreover, the bottom surface of a woven material, facing the sponge, is also not lofty and is therefore difficult to attach to the sponge layer by implantation into the soft sponge.

SUMMARY OF THE INVENTION

Accordingly, it is an object of the present invention to provide an absorbent scrubbing device comprising an absorbent porous body and, affixed to one face thereof, a scrim comprising a woven backing and pile fibers interwoven into the backing, whereby the bottom surface of the backing is cofacial and affixed to the absorbent body by adhesive or by embedding into the absorbent body. In another embodiment, fabric thread, such as cotton or rayon, is interwoven into the woven backing to form fabric loops on the bottom of the backing whereby the fabric loops are embedded into the absorbent body to anchor the woven backing in the absorbent body. The fabric loops may be stiffened by starch or other water-soluble stiffener to rigidize them for gluing or embedding.

BRIEF DESCRIPTION OF THE DRAWINGS

FIGS. 2A, 2B, 2C and 2D schematically show a method of making a woven scrim having fabric loops and the step of attaching the scrim to the absorbent body.

DESCRIPTION OF THE INVENTION

In accordance with the present invention, a scrubbing surface is provided on an absorbent body, such as a regenerated cellulose sponge, or woven fabric, by affixing a woven scrim onto at least one surface thereof. The woven scrim comprises a woven backing into which are interwoven pile fibers, such that the pile fibers are oriented at a predetermined angle, typically between approximately 45°–90°, to the backing surface. On one surface of the woven backing, hereinafter referred to as the upper surface, the pile fibers appear as piles projecting from the backing to form the scrubbing surface.

Figure 1A:
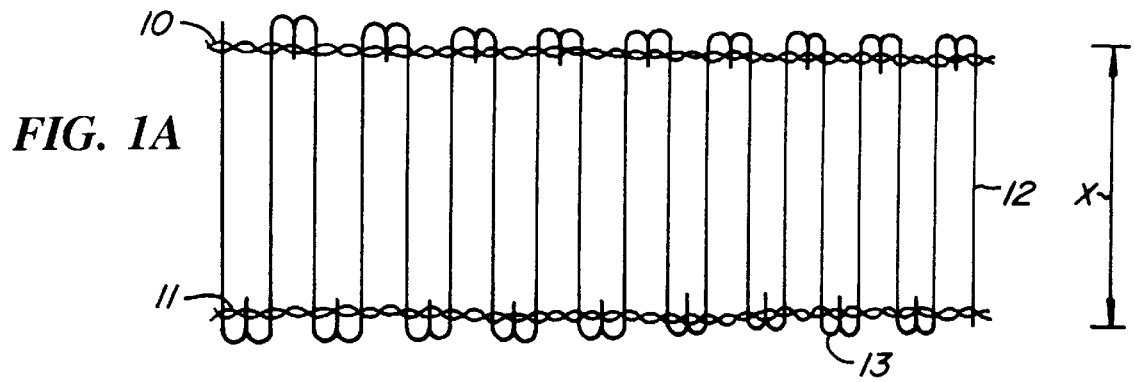
FIGS. 1A, B and C schematically show the process of making the woven scrim and the step of attachment thereof to the absorbent body.

Referring to FIG. 1 there are shown steps for producing the woven backing having the interwoven fibers described above. Referring to FIG. 1A, two woven backings, 10 and 11, are held parallel to each other and a rigid fiber 12 which is to form the piles, is interwoven into the backing layers 10 and 11 such that on the one face of each of the backings 10 and 11, respectively, loops 13 are formed. The length, X, of the rigid fibers 12 between the webs 10 and 11 is approximately twice the length of the desired height of the pile fibers in the final product. Typically, X will be about 2 inches or less so that the pile lengths will be about 1 inch or less.

Figure 1B:
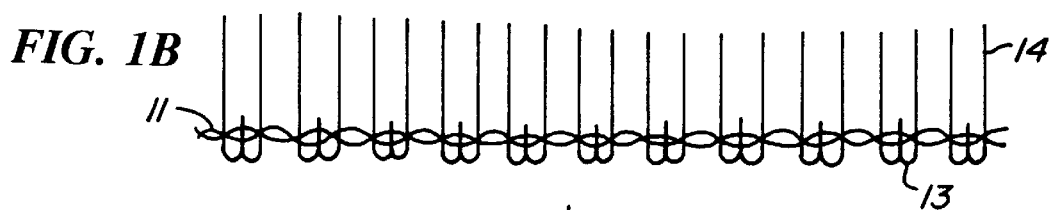
Figure 1C:
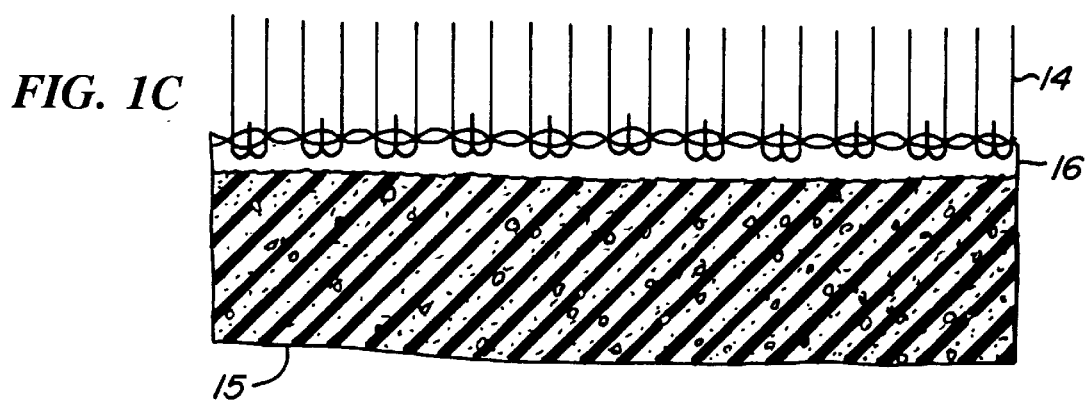

By cutting the pile fibers 12 in a plane parallel to and approximately equidistant between the woven backings 10 and 11, two woven layers, one of which is shown in FIG. 1B, are formed having on one surface thereof pile fibers 14 held by the woven backing 11. Only one of the woven layers is shown in FIG. 1B, but it will be understood that a second woven backing corresponding to backing 10 will also be simultaneously formed when the pile fibers 12 are cut. The woven backing 11 is then affixed to an absorbent body, such as a sponge 15, by adhesive which forms an adhesive layer 16, as shown in FIG. 1C. Adhesives which may be used are known in the art. For example, polyurethane two-component adhesives may be utilized which coat the surface of the sponge. Adhesives are known in the art and are disclosed, for example, in *Organic Polymer Chemistry*, Saunders, K. J., Halsted Press, Chapter 14 (1973), particularly pages 318–345.

Other types of adhesives may be utilized, provided that they sufficiently bind an absorbent surface, such as a moist sponge, and a woven material and do not harden sufficiently to detract from the flexibility of the device or interfere substantially with the transmission of liquids.

Referring to FIG. 2, there is shown a schematic diagram of another embodiment wherein the woven layer is modified for direct attachment to the sponge without an adhesive. The double layer woven starting material in FIG. 2A is similar to the material shown in FIG. 1A, except that the woven backings 10 and 11 are modified by interweaving therein a fabric thread which forms fabric loops 17 extending from the backings 10 and 11. These loops 17 extend beyond the loops 13 formed by the pile fibers so as to form a better means of attachment of the backings 10 and 11 to the sponge. Loop 17 may be stiffened with starch or other water-soluble stiffener to rigidize the loops during processing. The starch is later dissolved during use of the device or regeneration of the sponge. In FIG. 2B there is shown one of the scrims formed by cutting the pile fibers 12 in a plane parallel to woven backings 10 and 11 approximately equidistant between the backings. In FIG. 2C, the loops 17 are embedded into the viscose cellulose material 19 before that material is regenerated to a solid form, indicated by the step in FIG. 2D.

Alternative methods for attaching the scrim to the absorbent body may include, for example, spraying or affixing a polyurethane foam coating on the bottom of the woven backing 11 in order to present an open or lofty polyurethane foam surface to the sponge material. The polyurethane foam may then be embedded in the viscose cellulose and the sponge is regenerated, as described in connection with FIG. 2. Alternatively, the polyurethane foam coating may be glued to the sponge as described in connection with FIG. 1.

In yet another embodiment, in lieu of the fabric loops 17, referring to FIG. 2, the woven backing 11 may be affixed to the sponge by sewing or gluing to a fabric having a lofty surface, such as terry cloth. The terry cloth may then be embedded into the viscose cellulose as described in connection with FIG. 2, or glued to the sponge as described in connection with FIG. 1.

Methods for regenerating cellulose to make porous sponges are known in the art. For example, a viscose cellulose material may be formed by steeping sheets of cellulose in 18½% (by weight) sodium hydroxide solution for a time sufficient to alkalize the cellulose. The resulting alkaline cellulose is mixed with carbon disulfide, for example, and the resulting mixture is agitated until cellulose xanthate is produced. This resulting cellulose xanthate is dissolved in a weak sodium hydroxide solution to produce a viscose cellulose product, typically containing between 5% and 7% by weight cellulose, 5% to 6% of alkalinity and about 2.3% to 2.6% total sulphur. This unripened material may be mixed with hemp fibers or other suitable reinforcing fibers, typically having an average length of about ⅜ to ½ an inch, while maintaining the mass at a temperature preferably below about 15° C. for about 20 minutes. To this mass is added sodium sulfate decahydrate crystals, having an average particle size in accordance with the desired pore size of the finished sponge. Typically, an average particle size of the sodium sulfate decahydrate of about 10 millimeters will produce a relatively course pore device, whereas an average particle size of about 2 millimeters will produce a relatively fine pore device. The mixing is continued for approximately an additional ten minutes while maintaining a temperature of 15° C. or less. This mass may then be deposited into molds or forms of any desirable configuration, preferably rectilinear and coagulated.

Alternatively, the mass may be deposited on a sheet or conveyer and skimmed to obtain the desired sponge height. While still in this viscose state, the scrims may be embedded. The bottom side of the scrims from which extend the fabric loops 17 may be embedded into one surface of the uncured cellulose, then the cellulose is coagulated and the cellulose is regenerated. This may be done by steeping the forms in boiling sodium sulfate solution, by subjecting to an atmosphere of high pressure steam in an autoclave, or by raising the temperature of the mass by passing a heavy electric current therethrough, preferably using AC. During the coagulation process, the sodium sulfate decahydrate crystals liquify and flow from the mass leaving the corresponding pores.

The coagulated cellulose sponge may then be washed in hot water to remove the remaining sodium sulfate decahydrate, neutralized in base, such as sodium hydrozide solution, and bleached with a water solution containing hypochlorite. The bleached blocks or sheets may then be treated in hot oxalic acid and again washed to remove traces of the acids. The blocks or sheets may then be sprayed with a humectant such as glycerin, PEG, propylene glycol, urea or mixtures thereof and dried to the desired moisture content. Antifungal agents, such as quaternary ammonium compounds, may be added to prevent growth of mildew in moist sponges.

The materials of which the woven backing 10 and 11 and the pile fibers 14 may be formed may be natural (such as cotton) or synthetic fibers such as polypropylene, rayon, and the like, with polypropylene being the material which is preferred. Fine metal fibers, such as stainless steel may also be useful. The weave of the backing material 10 and 11 will be tight enough to hold the pile fibers 14 in essentially fixed position at predetermined angles to the backing, and also to minimize leakage of unregenerated viscose cellulose through the backing when the reverse surface is partially embedded into the viscose material.

In the embodiment wherein fabric loops 17 are woven into the bottom surface of the woven backing 10 and 11, or when an additional cloth layer such as terry cloth, is utilized as described above, these materials are preferably made of cotton, rayon or other materials which exhibit strong affinity for the regenerated sponge after being embedded.

Figure 3:
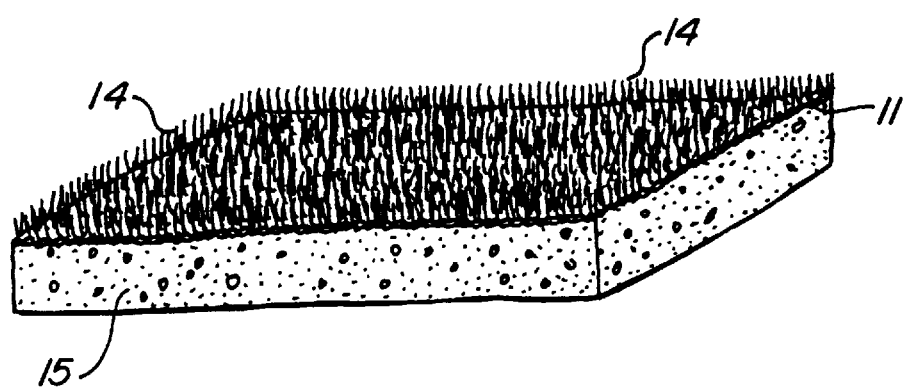
FIG. 3 is a perspective view of a scrubbing device according to the invention.

The final product, referring to FIG. 3, will comprise an absorbent body 15 having affixed to at least one surface thereof a woven backing 11 having pile fibers 14 projecting therefrom in substantially vertical orientation. Depending upon the process used for fixing the woven backing 11 to the absorbent material 15, an adhesive layer (not shown) and/or an additional layer (not shown) such as polyurethane foam or fabric cloth may be used.

The following example is provided by means of illustration of the invention.

EXAMPLE

Comparison of Invention With a Commercial Scrubber

A scrubber having a scrim of woven backing and interwoven fibers according to the invention was compared with a commercial scrubber, Scotch™ Brite HDKSS, having a non-woven scrim. Aluminum panels were soiled with 10 grams of cheese (5" strip) and melted on a hotplate at medium setting for 1 to 2 minutes. One cycle of scrubbing with a scrubber is defined as one back and forth motion of the scrubber over the soiled area using moderate pressure with a Gardner Ware Tester to minimize bias among the test runs. Each scrubber was tested six times on freshly soiled panels, with each test comprising 40 cycles. The percent removal of the cheese was measured and averaged over the six tests to evaluate cleaning performance. The scrim according to the invention showed an 82±9% removal of the burnt-on cheese, whereas the commercial scrubber showed 52±4% removal. In addition, an abrasion scale of 1 to 5 was used to assess the scratching caused by the scrubbers on the aluminum surface (5=extreme scratching; 1=very little scratching). The abrasion caused by the scrubber of the invention was estimated as 1, and the abrasion for the commercial scrubber was estimated as 5. Commercial sponges advertised as "nonscratch", Scotch Brite All-Purpose and Brillo All-Purpose, were shown to scratch plastic surfaces at a 3 and 4 level, respectively, on a 5-point scale, whereas the scrubbers according to the invention had a scratch grading at a 1 level.

What is claimed is:

1. A scrubbing device having scouring surface comprising an absorbent porous body comprising regenerated cell cellulose sponge having a woven web superimposed upon and cofacially affixed to at least a portion of said absorbent body; said woven web comprising a woven backing and pile fibers interwoven into said backing wherein said pile fibers form ends extending from said backing to form said scouring surface of said device; and further comprising thread interwoven into said backing to form loops which project from said backing in the direction cofacial to said absorbent body and said loops are embedded into said absorbent body to anchor said woven web thereto.

2. A device according to claim 1 wherein said pile fibers extend in a direction substantially perpendicular to said woven backing.

3. A device according to claim 1 wherein said woven web is affixed to said absorbent body with adhesive.

4. A device according to claim 1 wherein said woven backing and pile fibers comprise synthetic fibers.

5. A device according to claim 1 wherein said thread comprises cotton or rayon.

6. A device according to claim 1 further comprising an additional layer affixed to said woven backing and absorbent body.

7. A device according to claim 6 wherein said additional layer comprises a synthetic material.

8. A device according to claim 7 wherein said synthetic material comprises polyurethane foam.

9. A device according to claim 6 wherein said additional layer comprises a fabric cloth.

10. A device according to claim 6 wherein said additional layer is embedded within said absorbent body.

11. A device according to claim 6 wherein said additional layer is affixed to said absorbent body with an adhesive.

12. A device according to claim 1 wherein said pile fibers extend from the surface of said woven web less than one inch, measured in the direction perpendicular to said backing.

* * * * *